United States Patent [19]

Coleman et al.

[11] Patent Number: 5,696,370

[45] Date of Patent: Dec. 9, 1997

[54] BAR CODE SCANNING SYSTEM FOR AUTOMATICALLY CALCULATING THE OPTICAL POWER OUTPUT LEVELS OF THE LIGHT SOURCE

[75] Inventors: Edward P. Coleman, Fairport; Scott R. Grodevant, Hilton, both of N.Y.

[73] Assignee: PSC Inc., Webster, N.Y.

[21] Appl. No.: 748,051

[22] Filed: Nov. 12, 1996

Related U.S. Application Data

[63] Continuation of Ser. No. 612,101, Mar. 7, 1996, abandoned, which is a continuation of Ser. No. 524,075, Sep. 6, 1995, abandoned, which is a continuation of Ser. No. 395,955, Feb. 28, 1995, abandoned.

[51] Int. Cl.$^6$ ...................................................... G06K 7/10
[52] U.S. Cl. .................... 235/455; 235/462; 250/205; 250/568
[58] Field of Search .................................. 235/455, 462, 235/472, 454; 372/38, 31; 250/205, 568

[56] References Cited

U.S. PATENT DOCUMENTS

| | | | |
|---|---|---|---|
| 3,517,167 | 6/1970 | Bell | 235/455 X |
| 3,860,794 | 1/1975 | Knockeart et al. | 235/455 |
| 3,944,979 | 3/1976 | Kwok | 250/205 X |
| 4,250,488 | 2/1981 | Haupt | 250/205 |
| 4,315,245 | 2/1982 | Nakahara et al. | 235/455 X |
| 4,406,996 | 9/1983 | Oka | 250/205 X |
| 4,567,360 | 1/1986 | Yamada | 235/455 |
| 4,593,194 | 6/1986 | Graham et al. | 250/205 X |
| 4,734,566 | 3/1988 | Senda et al. | 235/455 |
| 4,906,842 | 3/1990 | Melcher | 250/205 |
| 5,134,273 | 7/1992 | Wani et al. | 250/205 |
| 5,308,962 | 5/1994 | Havens et al. | 235/455 |
| 5,382,782 | 1/1995 | Hasegawa et al. | 235/455 |
| 5,406,077 | 4/1995 | Aoki et al. | 250/205 X |
| 5,440,113 | 8/1995 | Morin et al. | 250/205 |
| 5,473,153 | 12/1995 | Araki et al. | 250/205 |

FOREIGN PATENT DOCUMENTS

| | | |
|---|---|---|
| 0364676 | 4/1990 | European Pat. Off. . |
| 0585595 | 3/1994 | European Pat. Off. . |
| 61-55735 | 7/1986 | Japan . |
| 62-298705 | 12/1987 | Japan . |
| 63-282606 | 11/1988 | Japan . |
| 1121986 | 5/1989 | Japan . |
| 2183385 | 7/1990 | Japan . |
| 2244388 | 9/1990 | Japan . |
| 2227093 | 7/1990 | United Kingdom . |

*Primary Examiner*—Donald T. Hajec
*Assistant Examiner*—Michael G. Lee
*Attorney, Agent, or Firm*—Foley & Lardner

[57] ABSTRACT

A system for bar code reading and scanning is provided having automatic bar code signal size control. The scanner includes a processor which calculates, in response to a signal power level of the symbol which has been read, a first optical power level when the beam is scanned in a first direction and a second optical power output level when the beam is scanned in a second direction. This calculation is responsive to the power level and the detected signal size of the preceding scan.

17 Claims, 10 Drawing Sheets

BAR CODE SCANNING SYSTEM FOR AUTOMATICALLY CALCULATING THE OPTICAL POWER OUTPUT LEVELS OF THE LIGHT SOURCE

This application is a continuation of application Ser. No. 08/612,101, filed Mar. 7, 1996, now abandoned which is a continuation of Ser. No. 08/524,075, filed Sep. 6, 1995, now abandoned which is a continuation of Ser. No. 08/395,955, filed Feb. 28, 1995, now abandoned.

DESCRIPTION

FIELD OF INVENTION

The present invention relates to systems (methods and apparatus) for reading and scanning symbols, and more particularly to a bar code scanner and reader having automatic bar code signal size control. This application is related to a U.S. patent application Ser. No. 08/296,788 filed Aug. 26, 1994 by an inventor hereof.

BACKGROUND OF THE INVENTION

Bar code scanners generally operate by scanning a light beam across a symbol and translating the light reflected from the symbol into signals representing a bar code. The components of a bar code scanner include a light source to produce a light beam, an arrangement of mirrors and optics for light transmission and collection, a photo-detector to change returned light into electronic signals (referred to as photo-detector signals herein), and signal processing electronics to translate the photo-detector signals into time-variant signals for bar code decoding.

The strength or size of the photo-detector signals depends on the intensity of the returned light from the symbol. (Signal size as used in this description is a representative amplitude during a measurement interval, but may be other representations of amplitude, eg. peak, average, or rms over the measurement interval.) The returned light intensity varies with the distance of the symbol to the scanner, and the optical output power of the light source. The fluctuations in light intensity results in variations in the size of the photo-detector signal, producing problems in signal processing. Specifically, the signal processing electronics contain a digitizer circuit for producing an analog bar code signal having voltage levels suitable for digital bar code decoding. If the signal to the digitizer is too high in size, the digitizer becomes overloaded and cannot operate, while if the signal to the digitizer is too low in size, the digitizer cannot convert the signal with high accuracy.

This problem is typically addressed by providing amplification to increase the signal size prior to the digitizer. In the prior art, amplification has been provided by analog amplifier circuits which vary the amplification gain level using a feedback loop from a peak detector circuit. Also the prior art has incorporated digital potentiometers within the feedback amplifier circuit to digitally set the level of amplification gain. See U.S. Pat. No. 5,200,597 issued Apr. 6, 1993 to J. Eastman, et al. and/or U.S. Pat. Nos. 5,237,161, issued Aug. 17, 1993 and 5,260,554, issued Nov. 11, 1993 to S. Grodevant. A drawback to this solution is that it requires additional amplification circuitry which generates undesired noise in the signal from the photo-detector. This noise, if excessive, will degrade the performance of the digitizer circuit.

SUMMARY OF THE INVENTION

Accordingly, it is an object of the present invention to provide an improved system for control of the size of signals produced by a photo-detector corresponding to the intensity of light returned from a target (called hereinafter a bar code signal size), especially by digitally controlling the intensity of the light from a source which illuminates the bar code, referred to hereinafter as the optical output power level, without the need for continuously searching for a gain level by which the signal from the photo-detector is amplified.

It is also an object of the invention, in accordance with one embodiment of the improved bar code signal size control system of the invention, to provide an improved optical power (as from a laser or other light source control system) in which control of bar code signal size is operative by selecting one of a plurality of optical power levels of the light source responsive to the size of the signal from the photo-detector. The term "optical" or "light" should be taken to mean radiant energy which can propagate through space as a beam. Preferably, the beam is in the optical wavelength range, although it may be invisible to sighted humans, and is also preferably a laser beam.

It is also an object of the present invention in accordance with other embodiments thereof to provide an improved optical power control system in which improved control of bar code signal size is obtained by calculating the optical power level in response to the size of the signal detected by a photo-detector, and a pre-existent optical power level from a light source.

A still further and more general object of this invention is to provide an improved system for digital control of optical output power level by monitoring the intensity of the returned light with a photo-detector optically coupled to the light source.

It should be understood that the invention comprehends the attainment of one or more of the foregoing objects and/or other objects and features as will be apparent from the description of the invention.

Briefly described, in the invention in accordance with a first embodiment thereof is useful in a bar code scanning and/or reading system which includes a light source, which produces optical energy, and which produces an optical power output level which is variable. The beam is incident on a target (e.g. a bar code symbol which is to be read) and preferably transverses the target in successive scans thereof. Light is returned from the target to a photo-detector. The system includes a processor and control circuitry for setting the optical power output level to different ones of a plurality of optical power output levels. A photo-detector and associated circuitry produces a signal responsive to the returned light received by the photo-detector. The processing circuitry has signal size detector circuitry for detecting the bar code signal size in response to the signal from the photo-detector circuitry during the scans. The processor selects, on each of the successive scans, an optical power output level from the plurality of levels, responsive to the detected signal size. The output power level for the light source is controlled by the control circuitry to produce the selected level.

In accordance with a second embodiment of the invention the processing circuitry is operative over a plurality of consecutive scans, N of which occur until the symbol is read, and controls the power level for each scan (except the first) based upon the level and signal size on prior scans. The system has circuitry for setting the optical power output of the light source. The circuity is operative on the first of the consecutive scans (N=1) for setting the light source to a starting optical output power level for the first scan. The processor further has circuitry, preferably in the form of computing facilities, for calculating a first calculated optical power level after each odd scan (where N is odd 1, 3, 5, etc . . .) in response to both the optical power level of the light source and the detected signal size during one of the prior scans. A second calculated optical power level is calculated after each scan where N is even, which is represented by an optical power level proportionately opposite to the optical power level on the preceding scan, where N is odd, about an average power level for the light source. The power level for scans where N is odd (N being greater than one) is set to the second calculated power level, and is set to the first calculated power level for the scans where N is even.

In accordance with a third embodiment of the invention, where the scans occur consecutively until the symbol bar code is read, the system control circuity is operative at a starting optical output power level for the first scan. The calculation facilities are operative for each scan for calculating an optical power level of the light source after each scan in response to the power level and detected signal size during the preceding scan. The circuitry for setting the power of the light source sets the power level for a subsequent ones of the consecutive scans to the calculated level.

BRIEF DESCRIPTION OF THE DRAWINGS

The foregoing and other objects, features and advantages of the invention as well as presently preferred embodiments thereof will become more apparent from a reading of the following description in connection with the accompanying drawings in which.

DETAILED DESCRIPTION OF THE INVENTION

Figure 1:
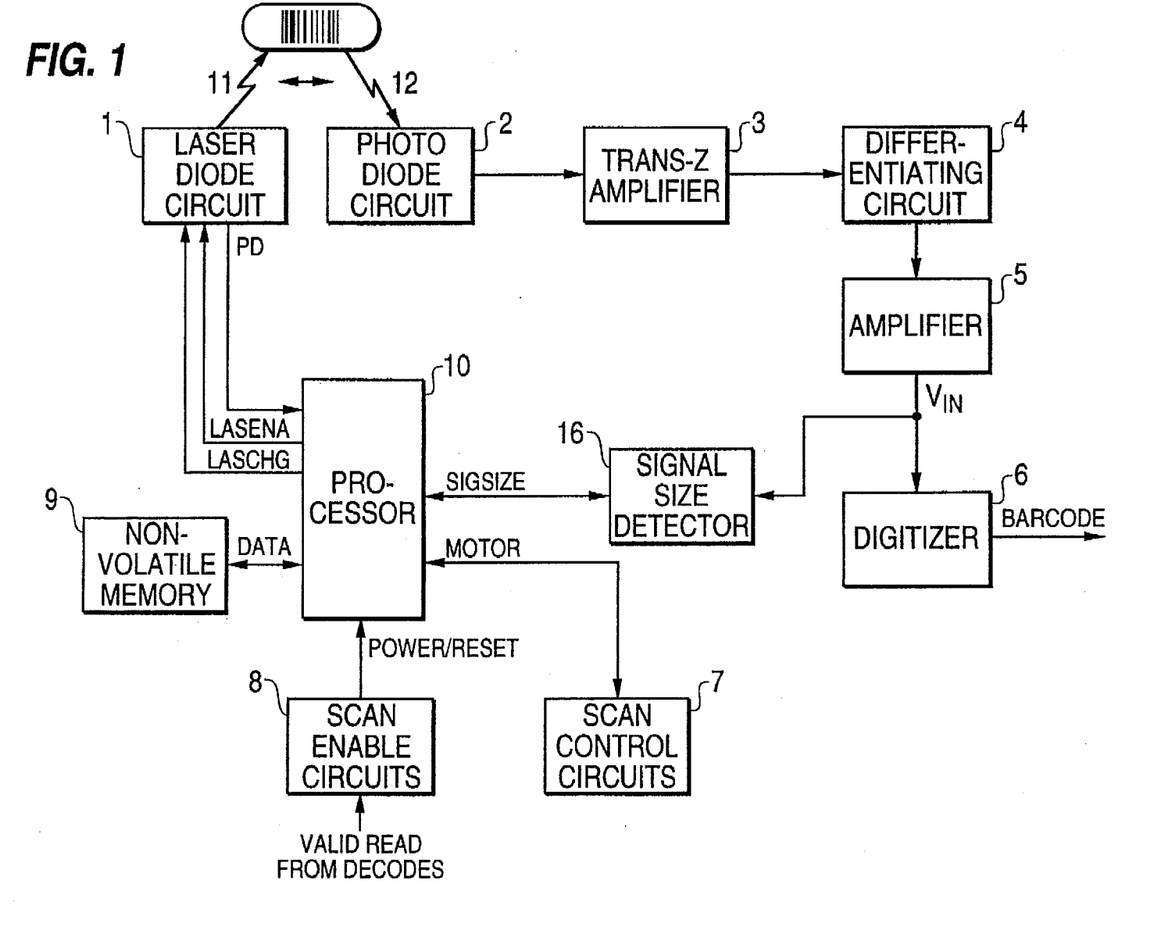
FIG. 1 is a block diagram of a system in accordance with the invention.

Referring to FIG. 1, there is shown a block diagram of the system. This system may be embodied in a bar code scanner of the type shown in the above referenced U.S. Pat. No. 5,200,597. The light source, preferably a laser diode, is contained in laser diode circuit 1. The laser diode projects a light beam 11 which scans across a target, shown as a bar code symbol 13. Returned light 12 from the symbol is received by photo diode circuit 2. The light beam 11 and returned light 12 are represented as jagged arrows to and from the symbol. Mirrors and optics in the scanner, not shown in FIG. 1, are provided to direct and project the light beam 11 and to collect returned light 12. A processor 10 controls the scanning via command signals on a line MOTOR. This line is connected to scan control circuits 7 (called "scan control"). Scan control 7 controls a motor within the scanner which changes the angular position of light beam 11 relative to the symbol, thereby scanning the beam over a desired scan angle and at a desired scan rate.

A photo diode circuit 2 contains a photo-detector, preferably a photo-diode, and translates the returned light 12 into an electrical current of amplitude corresponding to the intensity of the returned light. A transimpedance (TRANS-Z) amplifier 3, produces a voltage signal which varies corresponding to the current applied thereto. The voltage signal from the amplifier 3 is differentiated in a differentiating circuit 4 to produce a signal that enhances the transitions in the voltage signal from amplifier 3. These transitions correspond to locations of the edges of the bars and spaces of the symbol. The signal from the differentiating circuit 4 is amplified in a fixed gain amplifier 5, operative to provide the fixed gain over sufficient band-width to follow and amplify the transitions. The amplified signal is called Vin which is imput to a digitizer 6. The digitizer may be similar to the digitizer circuit described in the above referenced U.S. Pat. No. 5,200,597. The digitizer converts the signal Vin into BARCODE, which is a voltage signal composed of analog pulses corresponding the signal to the widths of the bars and spaces of the bar code. BARCODE is transmitted from the digitizer to a decoder (not shown) for determining the presence of a bar code. Alternatively, BARCODE the signal may be sent to a processor input port if decoding is provided by the processor 10. The signal Vin is also applied to a signal size detector 16, shown in greater detail in FIG. 5, and which is described herein after. Signal size detector 16 provides the signal SIGSIZE, a signal representing the size of Vin, to a port which applies signal Vin to an analog to digital converter embedded in the processor 10. Presently a chip sold by Motorola Semiconductor Products (type 68HC705P6) is preferred.

A non-volatile memory 9 (e.g. an EEPROM) is connected to processor 10 via a DATA line. Memory 9 stores program parameters used in the processor. The use of such parameters is discussed in reference to scanning operations in connection with FIGS. 6–8. The processor can read memory 9 or write to memory 9 (additional address and read/write control lines are used in the conventional way and are therefore not shown).

Scanning operation is controlled by processor 10 in response to signals on POWER/RESET lines (shown as a single line in FIG. 1) from scan enable circuits 8. The scan enable circuits 8 control the activation of the system in response to a user operated switch within the circuits 8, such as a trigger or button, to start (enable) scanning, and stop scanning upon a valid read of a bar code by the decoder, or the release of the switch. The circuits 8 further control the supply of power to the system components (along a power bus not shown in FIG. 1).

In operation, the circuits 8, upon activation of the switch, allow power to be supplied to the system, and command the processor 10 via the POWER/RESET signal, to reset and enable scanning. The processor 10 waits for this command to scan from the scan enable circuits 8 before initiating scanning. When the switch is deactivated during scanning, or a valid read signal is sent to scan enable 8 from the decoder, scan enable 8 ceases system scanning by removing the power to the system, and signaling the processor 10 to disable via the POWER/RESET signal. The above procedure for ceasing system scanning by scan enable 8 is hereafter referred to as a system reset.

A sound generating circuit having a speaker (not shown in FIG. 1) is included in the system to sound a beep upon a valid read of a bar code. It is connected to the decoder circuit, and is used during scanning to indicate to a user that a valid bar code read has occurred.

Processor 10 may be a single microprocessor or several processors which operate in conjunction. A program stored in the processor (or a ROM not shown in FIG. 1) controls the operation of the system. The processor contains a built-in analog to digital converter with input ports to the converter, however in the alternative, the processor may utilize a separate component providing analog to digital conversion. One or more of these ports are programmable by the processor to operate in either an input or output mode. The processor also has built-in memory for storing data during processing, but alternatively may use a separate RAM to provide this function.

FIG. 1 only shows the control and input lines to the processor applicable to the herein described system. Additional control lines may be provided in accordance with conventional practice for other features, such as a diagnostic lines, programming lines, and the like, and are not shown to simplify the description.

Figure 2:
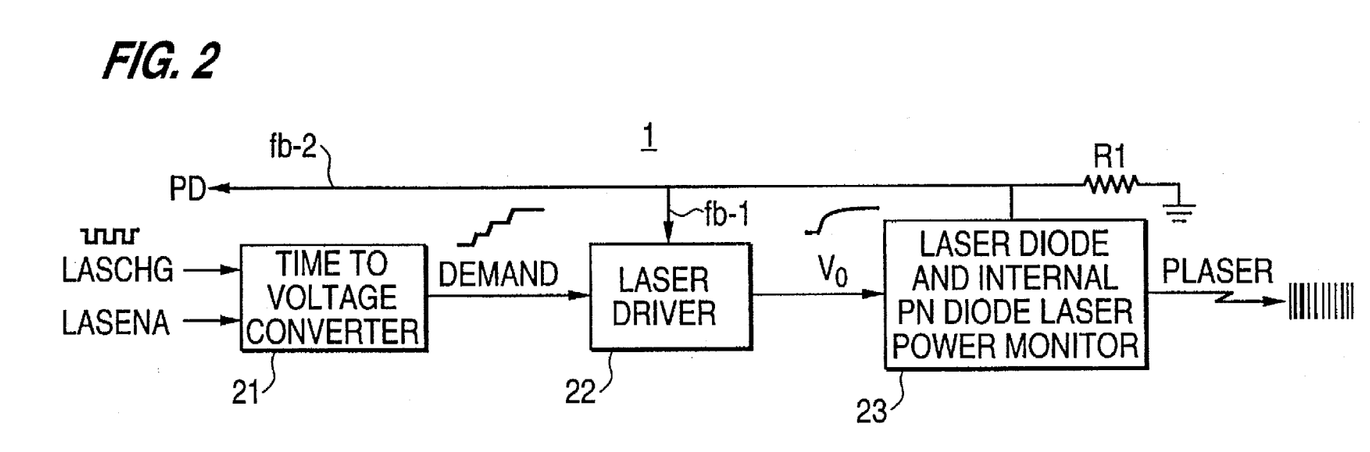
FIG. 2 is a block diagram of the laser diode circuit shown in FIG. 1.
Figure 3:
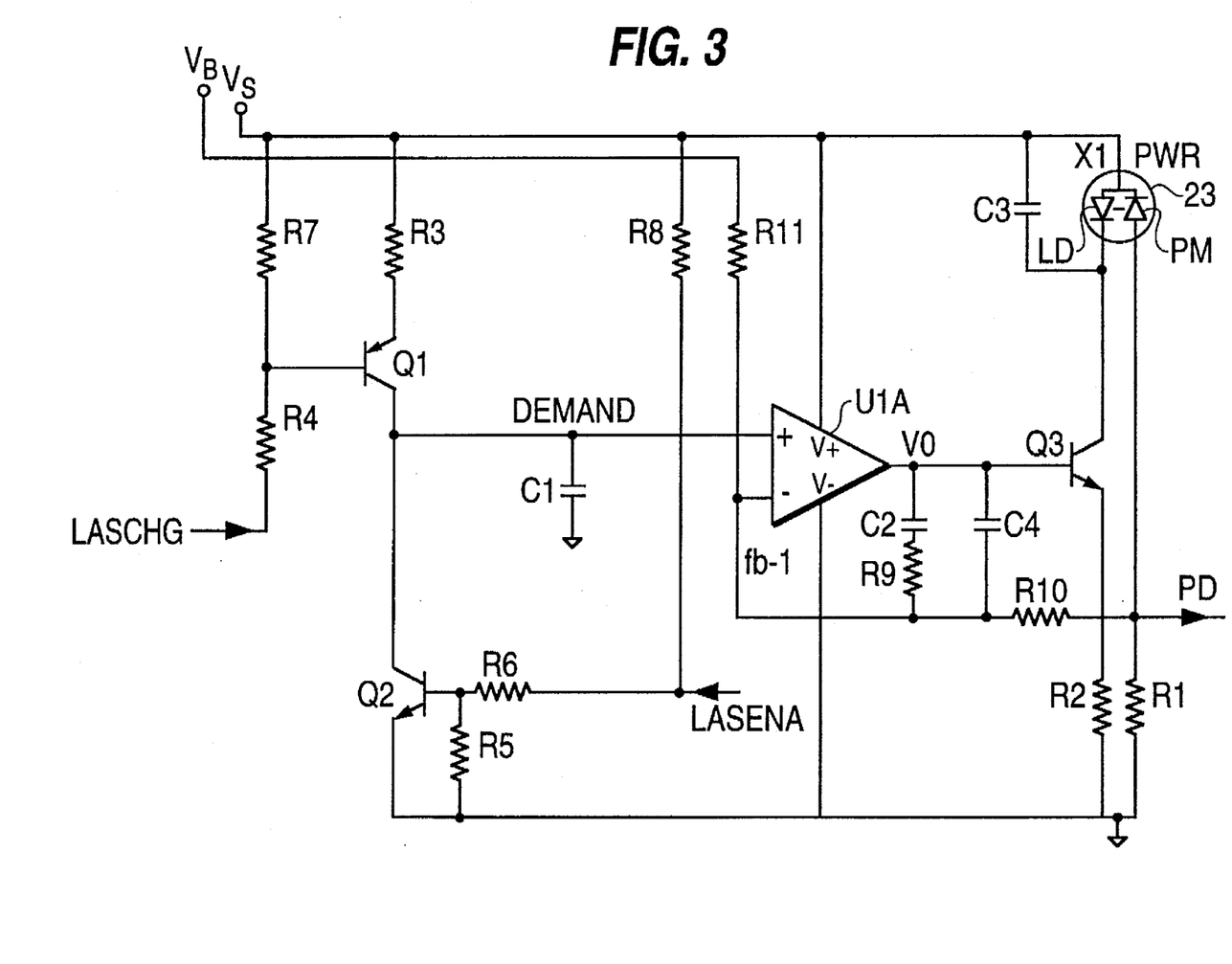
FIG. 3 is a schematic diagram of the laser diode circuit shown in FIGS. 1 and 2.
Figure 4A:
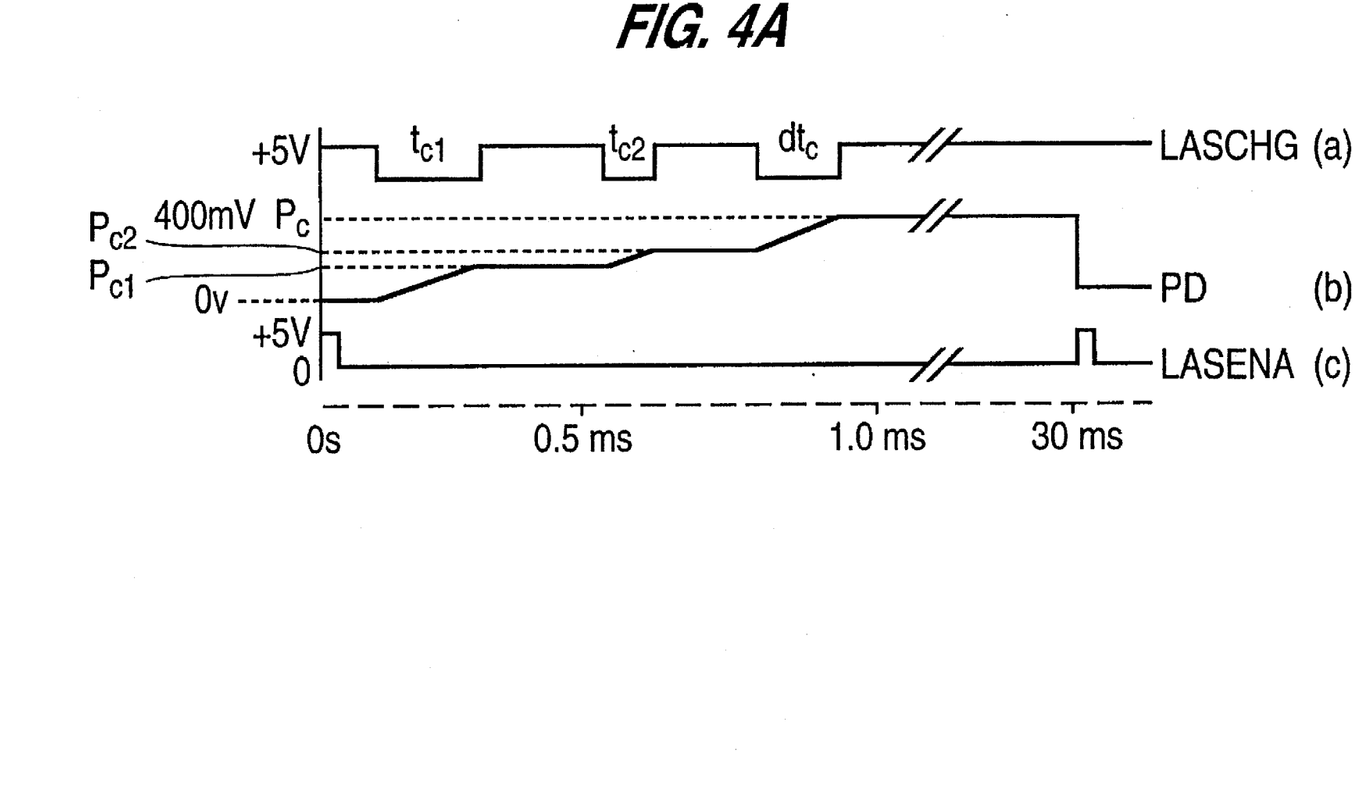
FIG. 4A is a timing diagram of signals and pulses generated during operation of the circuit shown in FIGS. 2 and 3.

Now turning to FIGS. 2 and 3, the laser diode circuit of FIG. 1 is shown in greater detail. Referring first to FIG. 2, there is shown input line PD to the processor 10, which is to another port (besides the port which received SIGSIZE) to the analog to the digital converter (ADC) of processor 10, and also shown are output lines LASENA and LASCHG. The signals or pulses outputted by the processor 10 on lines LASENA and LASCHG are inverted, as shown in FIGS. 4 and 4a. The digital control of laser power used in the herein illustrated system is similar to digital control as described in Application Ser. No. 08/296,788 filed Aug. 26, 1994 by an inventor hereof and referenced above.

Processor output LASCHG provides a series or sequence of pulses. Three LASCHG pulses are shown above the LASCHG line. One of these pulses, namely the last, determines the output optical power (Plaser) from a laser diode 23 (LD in FIG. 3). An internal photodetector (PM—FIG. 3) optically coupled to (and which may be in the same assembly or package at) the laser diode monitors the laser power and provides a current through a monitor resistor R1. The voltage across resistor R1 is the internal photodetector monitor voltage (PD). This voltage is fed back as signal fb-2 to the PD input of processor 10.

The processor also generates a reset pulse, LASENA. This pulse is timed to occur at the end of a scan, and is used to pulse the laser scanner to detect the presence of an object or bar code label and initiate scanning, as referred to in U.S. Pat. Nos. 5,237,161 and 5,260,554. Reference may be had to the U.S. Patents referenced above, for the design of the software and hardware which provides the continuous scanning mode and also signals which are generated at the start of each scan (SOS).

The LASCHG pulses charge a capacitor (C1—FIG. 3). The duration of these pulses is converted to a corresponding voltage in a time to voltage converter 21 for the three LASCHG pulses shown above the LASCHG line. A quasi staircase waveform to a desired demand voltage DEMAND shown above the DEMAND line is obtained. The DEMAND voltage is applied to a laser driver stage 22 which produces a drive voltage (Vo) to control the current through the laser diode 23. The laser driver 22 is also in a feedback relationship with the laser diode and receives the signal PD through an isolating resistor (not shown in FIG. 2) as feedback voltage fb-1.

During calibration or prior to starting each scan, it may be desired, before the DEMAND voltage attains the value corresponding to the desired laser power (Plaser), to optionally cut off the output beam from the laser. To this end, a shutter (not shown) controlled by processor 10 may be used. Alternatively, the mirror of the scanner or the laser mount may be moved so as to tilt the beam away from a window in the housing of the bar code scanner through which the beam projects. The term shutter includes the hardware or software in the controller necessary to control the tilting of the mirror or laser mount or the introduction of a physical shutter.

Referring to FIG. 3, the laser diode circuit 1 (FIG. 1) includes the laser 23, the time to voltage converter 21, and the laser driver 22 (FIG. 2). The operating voltage is supplied from a supply voltage source indicated as $V_s$ which may be of a level usual for TTL logic circuit, namely, 5 volts to ground. A bias voltage $V_B$ is utilized as an offset voltage (here 1.2 volts) in order to assure laser cutoff when the time to voltage converter 21 is reset. R1 is also shown in FIG. 3. The demand voltage DEMAND is generated by charging the capacitor C1 via a current source provided by transistor Q1, and resistors R3, R4 and R7. Capacitor C1, therefore, charges at a linear rate for the duration of each pulse of the LASCHG pulses.

The capacitor C1 need not be a special high tolerance capacitor, but may be a low cost capacitor; the capacitance value of which is rated to a tolerance of 20–30%. There are also tolerances in each of the resistors and in the transistors such that the DEMAND voltage, as a function of the duration of the LASCHG pulses may vary. However, the relationship is monotonic and linear. The system is operative to adjust one of the LASCHG pulses, and particularly last in a succession of the three consecutive pulses so as to translate LASCHG pulses into a DEMAND voltage of the amplitude corresponding to the desired laser output power.

During scanning, the laser power output is in continuous operation, i.e. the DEMAND voltage is maintained during the scan. A reset circuit responsive to the LASENA pulse from the microprocessor of the processor 10 includes transistor Q2, and resistors R5 and R6. Transistor Q2 provides a discharge path for capacitor C1 when the LASENA pulse is applied thereto. The leakage of current from capacitor C1 until the LASENA pulse is applied is limited because the principal leakage paths are through the emitter and collector junctions of transistor Q1 and Q2 which present a very high resistance when cut-off. Also, the input to the laser driver 22 is at the direct input of an operational amplifier U1A which is also a very high resistance. Thus, the DEMAND voltage may be maintained for sufficient time to complete a scan. The scan time may vary from 20 to 70 milliseconds (ms).

Amplifier U1A has a direct input (+), also called a non-inverting input, and inverting input (−). The operating voltage Vs is applied between so-called rail inputs v+ and v−. The output of amplifier U1A is signal V0. This output is applied to a voltage to current converter (a transconductance element including Q3 and R2). The collector to emitter path of transistor Q3 and resistor R2 are in series with the laser diode (LD) of the laser diode photodetector PM unit 23 (also labelled X1).

Laser power (Plaser) is an exponential function of laser current. The output of the photodetector (PD) is a linear function of the laser power and is fed back to the inverting input of amplifier U1A, as signal fb-1, via an isolating resistor R10 much higher in resistance value than resistor R1. Accordingly, the relationship between the DEMAND voltage, signal Vo and the laser drive current is logarithmic, due to the laser diode's exponential response in the feedback loop. But the relationship between signal PD, the DEMAND voltage and laser optical power is linear, because the photodiode PD current vs. optical power characteristic is linear over the operating range of the PD current. A compensating network to prevent oscillation is also connected in feedback relationship between the output V0 and the inverting input of amplifier U1A. This compensation network consists of capacitor C2, C4, resistor R9 and resistor R10. A capacitor C3 is connected across laser diode LD to suppress noise in the supply voltage $V_s$ from affecting the current through laser diode LD.

The laser diode circuit 1 is calibrated by determining, on the PD signal line to processor 10, the count corresponding to the desired optical output power from laser diode LD, and the time counts (duration of the LASCHG pulses) needed to produce the desired optical output power. For example, output power may be 400 µW which corresponds to a monitor voltage of 400 mV. The width of each LASCHG pulse provided by processor 10 to laser diode circuit 1 is composed of discrete pulses, where the width of each discrete pulse corresponds to a time count in processor 10. Each time count may be three microseconds in duration. For example, a sixty microsecond LASCHG pulse corresponds to twenty time counts (or discrete pulses) of three microseconds each. While the discrete pulses are generated, the number of counts stored corresponds to the PD signal amplitude for the desired power level. The calibration may require a hundred or more consecutive three microsecond pulses to reach the desired PD signal amplitude. The PD output corresponds to the desired power Pc from the laser. Pc corresponds to Plaser in FIG. 2. The digital value of the PD signal obtained upon analog to digital conversion in the processor 10 and the number of counts corresponding to the LASCHG pulse are stored in memory 9 by processor 10 during calibration or configuration, when the scanner is being manufactured, and are parameters used in computing LASCHG which sets Plaser.

Figure 4B:
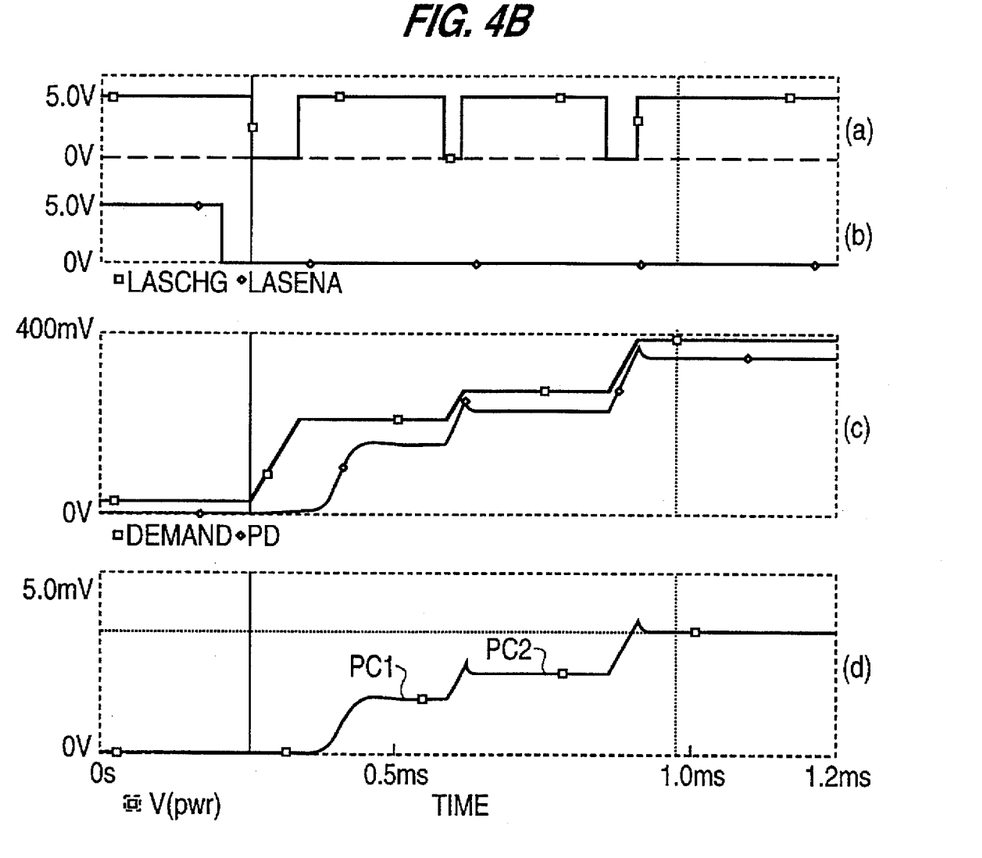
FIG. 4B is a more detailed timing diagram like FIG. 4A.

Referring to FIGS. 4A, and 4B, a first pulse of duration $tc_1$, suitably half the number of counts (half the duration) of the pulse time measured during calibration, is used as $tc_1$. Prior to $tc_1$, the capacitor C1 is discharged by application of the LASENA pulse (see (c) in FIG. 4A and (b) in FIG. 4B). The capacitor C1 charges during $tc_1$ and achieves a level corresponding to $Pc_1$, after a period for stabilization, say 100 microseconds. $Pc_1$ is stored in RAM (Random Access Memory) in the processor 10 in signal PD counts. The next pulse duration $tc_2$ is then generated. $tc_2$ is a fraction, say 30% of $tc_1$. Thus, if $tc_1$ is approximately 100 microseconds, $tc_2$ may suitably be 30 microseconds in duration. There is a stabilization period after $tc_2$ and before the final pulse, which is indicated as having a duration of $dt_c$. Accordingly, after the stabilization period, the PD voltage. (corresponding to $Pc_2$) is again measured in the processor 10. There are now two points of measurement and counts which are stored in processor RAM, which correspond to the durations of $tc_1$, $tc_2$, specifically $Pc_1$ and $Pc_2$, respectively. From these counts, by using a linear regression or least squares computation, the number of counts or duration for $dt_c$ in order to obtain the desired output power level (e.g., 400 mV for PD corresponding to 400 µW of power) can be computed in processor 10. This computation makes the laser diode circuit forgiving for variations in tolerances in the capacitor C1 and other components of the system, as may be caused by power supply variations or environmental conditions. The laser diode circuit, therefore, is capable of accurately selecting the desired laser power while preventing the voltage level to which the capacitor is charged from causing the laser to be driven at more than a safe operating current, thereby preventing destruction of the laser.

Processor 10 is programmed to compute the following equation:

$$dt_c = dP_c \frac{tc_2}{Pc_2 - Pc_1} \qquad (1)$$

where:

$dt_c$ is the additional charge time in counts (minimum resolvable time elements, 3 µs in this example);

Pc is the desired power setting in counts;

dPc is the desired change in power in counts (Pc–Pc$_2$);

$tc_1$ is the charge time for the first charge pulse in counts;

$tc_2$ is the charge time for the second charge pulse in counts;

$Pc_1$ is the first sample laser power in counts (PD); and $Pc_2$ is the second sample laser power in counts (PD).

In FIG. 4B, line (d) shows the optical power output of the laser diode. Also shown are the points in time when the laser power is measured.

In the alternative, the laser diode circuit may be operated in a pulse mode rather than in the continuous operation mode described above, with the use of additional circuit elements to the system. See Eastman, U.S. Pat. No. 5,019,698 issued Jul. 28, 1991. This mode of operation provides a laser operating at a fraction of laser power used during the continuous operation mode. To achieve this, the DEMAND signal is maintained only during the duration of the laser pulses which are generated during the pulse mode of operation.

After calibration, the laser diode circuit 1 (FIGS. 1–3), processor 10, and memory 9 provide for accurate setting of the optical power output of the laser diode necessary for digital control of the laser optical power during scanning. In operation, the power level for the laser may be set by the processor according to either values stored in memory 9, or to values calculated by the processor 10. These values are in terms of time counts, i.e. the duration of the LASCHG pulse, which correspond to the DEMAND voltage needed to charge the laser to the desired optical power values.

Figure 5:
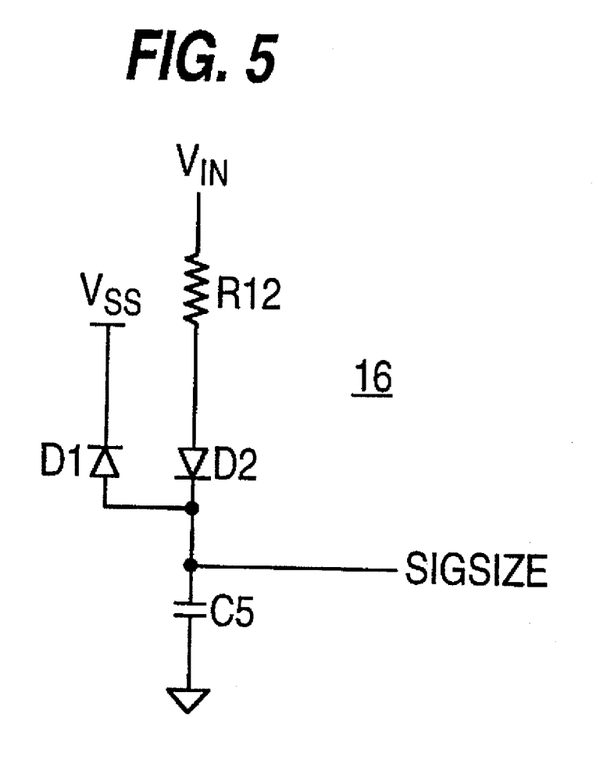
FIG. 5 is a schematic diagram of the signal size detector circuit shown in FIG. 1.

FIG. 5 shows a schematic of the signal size detector circuit 16 of FIG. 1. This circuit operates as follows: Before signal size is measured by processor 10, the detector is reset by discharging capacitor C5. This is achieved by the processor selecting the SIGSIZE port to operate in an output mode and supplying a ground voltage on the SIGSIZE line for a time period which will assure that all charge on capacitor C5 has dissipated. The processor then selects the SIGSIZE port to operate in input mode, and the detector is now ready to measure the signal size of signal Vin. To measure the size of signal Vin during a scan, diode D2 allows capacitor C5 to retain the highest AC amplitude of the Vin voltage minus a small voltage drop in diode D2 and a small (with respect to the resistance between the port which receives SIGSIZE and ground) resistor R12. The voltage on capacitor C5 is measured by the processor since it appears at the SIGSIZE port. The processor converts this voltage at the SIGSIZE port into a digital value for later processing.

The function of diode D1 in the detector is to provide for resetting capacitor C5 at power-down of the system to prevent C5 from back powering the processor through the processor's internal electrostatic discharge circuitry which is connected to the SIGSIZE port.

A measurement by processor 10 may be taken near the end of a scan, or at intervals during the scan, as directed by processor programming. Once the signal on the SIGSIZE line is measured, capacitor C5 may be reset by the processor for the next reading, and measured later during the ongoing scan or the next scan.

Alternatively, the signal size detector 16 may receive the voltage to be measured directly from the output of the differentiating circuit 4, and the processor programmed to respond according to the size of differentiated signal less amplification by the preset gain stage 5. Suitable components for the signal size detector 16 and other circuits are listed in Table I. It should be understood that these components and the values listed are exemplary and may vary for differences in the processor, or laser and laser power desired.

Figure 6:
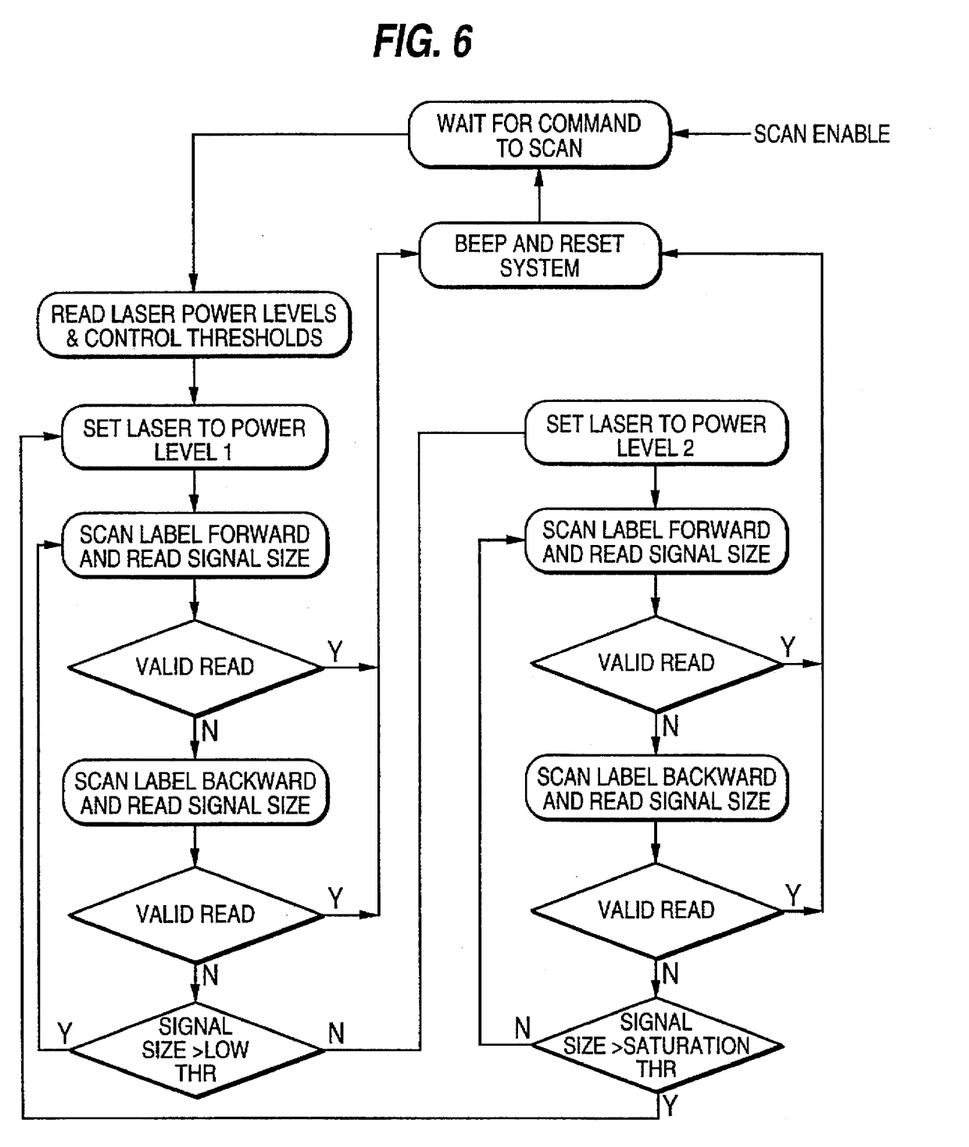
FIG. 6 is a flow chart of the scanning program embodied in the processor of FIG. 1 to provide a system in accordance with the first embodiment of the invention.

Referring to FIG. 6 there is shown a flow chart useful in programming the processor to provide a system which operates in accordance with the first embodiment of the invention. In this embodiment, the system selects one of several optical power levels for the laser 23 in response to the signal size detected on the prior scan. The selection of power levels utilizes two control thresholds, low threshold and saturation threshold. Low threshold is the level of signal size below which the digitizer cannot operate effectively. Saturation threshold is the level of signal size above which the digitizer circuit input saturates, causing the digitizer to no longer function. Therefore, the control thresholds used will depend on the particular digitizer in the system. Both thresholds are stored in memory 9 in terms correlated to detected signal size during scanning in order to facilitate comparison of each threshold to detected signal size.

As shown in FIG. 6, processor 10 (FIG. 1) is programmed to wait for a command to scan from the scan enable circuits 8 before initiating scanning. Once the processor receives this command, it reads from memory 9 the two optical laser power levels to be used during scanning, and both control thresholds. The processor then operates the laser diode circuit 1 to set the laser to the lower of the two optical power levels (Power Level 1). The label containing the bar code is scanned twice in alternative directions across the label, referred to herein for illustrative purposes as forwards and backwards. During each scan across the label the processor 10 may read a single signal size, but preferably, the processor 10 reads the signal size from signal size detector 16 multiple times at timed intervals. The processor 10 stores each signal size reading taken during the scan in its memory (internal RAM), and statistically manipulates them to provide a single detected signal size value for later processing. For example the signal size readings may be averaged, or only a subset of the highest values may be averaged (for more detail, see description hereinafter in reference to FIG. 9). The processor 10 stores each scan's detected signal size measurement in its memory. If during the scan a valid read of the bar code occurs, the sound generating circuit beeps and/or other valid read indicator (e.g. a visible indicator), scan enable 8 signals the processor 10 to cease scanning, and the system resets and waits for the next command to scan.

If no valid read occurs, the system then selects the power level for the next scan. The processor calculates a weighted average of the two stored signal size measurements to provide a detected signal size representative of the size of Vin with the laser at Power Level 1. The weights in the calculation are empirically determined to provide a representative Vin signal size providing desired system performance. For example, the weighing may favor the later of the two detected signal sizes since it will be the more recent of the two, and hence more accurate. The processor 10 then compares this representative detected signal size at Power Level 1 with the low threshold. If the signal size is above the low threshold, the processor selects to continue at Power Level 1 for the next scan. However, if the signal size measured is below the low threshold, then the processor selects and sets the laser to the higher of the two power levels (Power Level 2). The label is scanned, and the processor provides a signal size representative of the size of Vin with the laser at Power Level 2, in the same manner as described above. If no valid read again occurs, the system selects the power level on the next scan. The representative detected signal size with the laser at Power Level 2 is compared with the saturation threshold. If this representative signal size is below the saturation level, the processor selects to continue at Power Level 2 for the next scan. But, if the measured signal size is above the saturation threshold, the processor selects and sets the laser to Power Level 1. Processor 10 will continue scanning as described above until a valid read of the bar code occurs, or the scan enable circuits signals to the processor to cease scanning.

The power levels used in scanning are empirically selected during manufacturing such that the Vin signal to the digitizer is within a signal size range for proper digitizer operation. Although FIG. 6 shows two power levels, more power levels may be used during scanning, then additional control thresholds are provided. For example, a third power level may be added with the addition of two middle thresholds spaced within a range between the low and saturation thresholds. Operation is similar to that already described, however, when signal size falls between the two middle threshold levels, the processor will set the laser to the third power level. While scanning at the third power level, if the measured signal size falls below the lower of these two middle thresholds, the laser power will switch to Power Level 2. If the third power level is used and if signal size falls above the higher of the two middle thresholds, the laser power will switch to Power Level 1. Consequently, when scanning at Power Level 1 and detected signal size falls below the low threshold, the laser power will switch to the third power level. Further, when scanning is at Power Level 2 and the measured signal size falls above the saturation threshold, the laser power will switch to the third power level. In this manner, additional power levels may be added, but two power levels are preferred.

Figure 7:
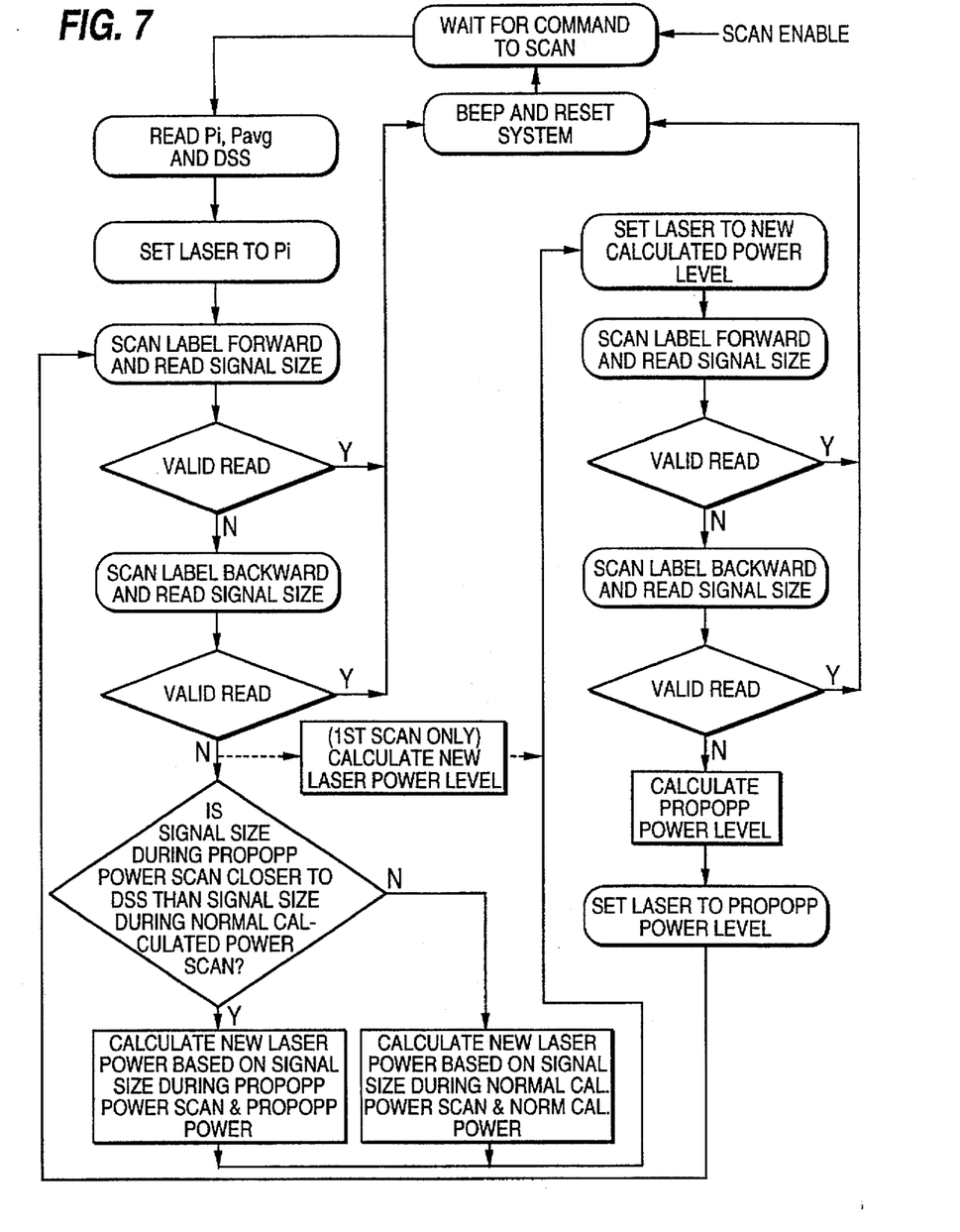
FIG. 7 is a flow chart of the scanning program embodied in the processor of FIG. 1 to provide a system in accordance with the second embodiment of the invention.

FIG. 7 shows how the processor of the system in the second embodiment of the invention is programmed. The primary difference between this embodiment and the first embodiment is that the optical power of the laser is calculated after every scan of the bar code. As shown in FIG. 7, the processor 10 waits for the command to scan from the scan enable circuits 8. Once the command to scan has occurred, the processor reads from memory 9 the starting power level of the laser, $P_i$, the average power level of the laser, $P_{avg}$, and the desired signal size, DSS. $P_i$ and $P_{avg}$ are empirically determined during the manufacturing of the system for the desired scanning range and laser devices used. $P_i$ represents the initial optical power level of the laser on the first scan, and should be a level near the middle of the laser optical power range. $P_{avg}$ represents half of the highest desired optical power of the laser. DSS is selected for the system to provide an optimum signal level to the digitizer. For example, where the digitizer has a range of 0.5 to 2.4 volts peak to peak, DSS may lie near 1.2 volts peak to peak.

After the processor has read the data from memory 9, the processor operates the laser diode circuit to set the laser to $P_i$. The label containing the bar code to be scanned is scanned forwards and backwards, each pass across the label being a full angular transverse of the scanning beam. On each scan across the label, signal size is read by processor 10 from signal size detector 16. It is useful in describing consecutive scans of a label to represent each scan, forwards and backwards, as an integer N, where consecutive scans are N=1, 2, 3, 4 ..., until a valid read occurs or scanning ceases. If during the first scan (N=1) a valid read of the bar code occurs, and the sound generating circuit beeps and/or other valid read indicator (e.g. a visible indicator) operates. Then scan enable 8 signals the processor to cease scanning, and the system resets and waits for the next command to scan. But, if after scan N=1 no valid read occurs, the processor calculates a new laser power level as shown by dotted line on FIG. 7. This calculation is made by implementing the following equation:

$$P_2 = P_i \frac{2DSS}{SS_f^1 + SS_b^1} \qquad (2)$$

where, $P_2$=calculated laser power on the for scan N=2

$SS_f^1$=signal size read on forward scan N=1

$SS_b^1$=signal size read on backward scan N=1

After calculating the laser power for scan N=2, the processor operates the laser diode circuit to set the laser to $P_2$. The label (i.e., the bar code) is scanned again forward and backward, with signal size reading taken on each scan. If no valid read occurs on scan N=2, the processor calculates a proportionately opposite ("PropOpp") power level in accordance with the following equation:

$$P_N = 2P_{avg} - P_{N-1} \qquad (3)$$

where, $P_N$=calculated PropOpp laser power for the $N^{th}$ th scan $P_{N-1}$=normal laser power for the $(N-1)^{th}$ scan Here, the processor calculates PropOpp power $P_3$ for scan N=3. (Power calculated using equation 3 will herein be referred to as PropOpp powers, and powers calculated using other equations as normal powers.) After calculating $P_3$, the laser is set to $P_3$, and the label is again scanned. If no valid read occurs, the processor produces representative signal size values for each scan N=2 and N=3. For example, by averaging the two signal sizes measured on the respective scan. The processor than checks whether the representative signal size during the PropOpp power scan of N=3, is closer to DSS, than the representative signal size during the normal power scan of N=2. If so, then the processor calculates the laser power for scan N=4 based on the power level and signal size measurements taken during proceeding scan N=3, implementing the following equation:

$$P_N = P_{N-1} \frac{2DSS}{SS_f^{N-1} + SS_b^{N-1}} \qquad (4)$$

where, $SS_f^{N-1}$=signal size read on the forward scan N–1

$SS_b^{N-1}$=signal size read on the backward scan N–1

If not, the processor calculates the laser power for scan N=4 based on the power level and signal size measurements taken under normal calculated power level scan N=2 with the following equation:

$$P_N = P_{N-2} \frac{2DSS}{SS_f^{N-2} + SS_b^{N-2}} \qquad (5)$$

where, $SS_f^{N-2}$=signal size read on the forward scan N–2

$SS_b^{N-2}$=signal size read on the backward scan N–2

In this manner the signal size readings used to calculate the laser power on the next even numbered scan, in this case scan N=4, will be based on power level and signal size readings of one of the last two scans having the a representative signal size closest to DSS.

Consider that in scanning, odd numbered consecutive scans, after N=1, will be at calculated PropOpp powers. Whereas, even numbered consecutive scans, will be at calculated normal powers. The calculated PropOpp powers are in a proportionately opposite relationship to the last calculated normal power about the average power of the laser, $P_{avg}$. Otherwise stated, the PropOpp power and last calculated normal power are equally distant on opposite sides of $P_{avg}$. For example, for scan N=13 if $P_{avg}$ represented 400 microwatts (since highest desired power is 800 microwatts) and normal power $P_{12}$ represented 600 microwatts, then PropOpp power $P_{13}$=200 microwatts. $P_{12}$ and $P_{13}$ are proportionately opposite to each other about $P_{avg}$ because 600 microwatts and 200 microwatts, respectively, are each 200 microwatts away from $P_{avg}$, 400 microwatts, but on opposite sides of $P_{avg}$.

Scanning continue as described above such that after even numbered scans the system calculates another PropOpp power after the laser using equation 3, and after odd numbered scans the system calculates the laser power using either equations 2 or 4, until a valid read occurs during scanning or scan enable 8 signals the processor to cease scanning.

In FIG. 7, during each scan across the label, the processor may read a single signal size measurement, but preferably, the processor 10 reads the signal size from signal size detector 16 multiple times at timed intervals in the scan. The processor 10 stores each signal size taken during the scan reading in its memory (internal RAM), and statistically manipulates them to provide a single detected signal size value for later processing. For example, the signal size readings may be averaged, or only a subset of the highest values may be averaged (for more detail, see description hereinafter in reference to FIG. 9).

Alternatively, more than two scans across a label may be performed before calculating each laser power. For each scan across a label, a detected signal size would be stored in the memory of processor 10, in the same manner as described above. During laser power calculation, the additional signal size readings taken would then be included in the denominator of equations 2–4, wherein the ratio (DSS to SS) in these equations are maintained by providing an integer in the numerator equal to the number of signal size measurements in the denominator.

This second embodiment of the invention provides an improved system for automatic signal size control to the digitizer in a feed-back control loop where signal size determines the power levels after the 1st scan. In this loop the use of PropOpp power levels on alternate scans converges the system to a laser power level which will provide a signal size to the digitizer near DSS.

Figure 8:
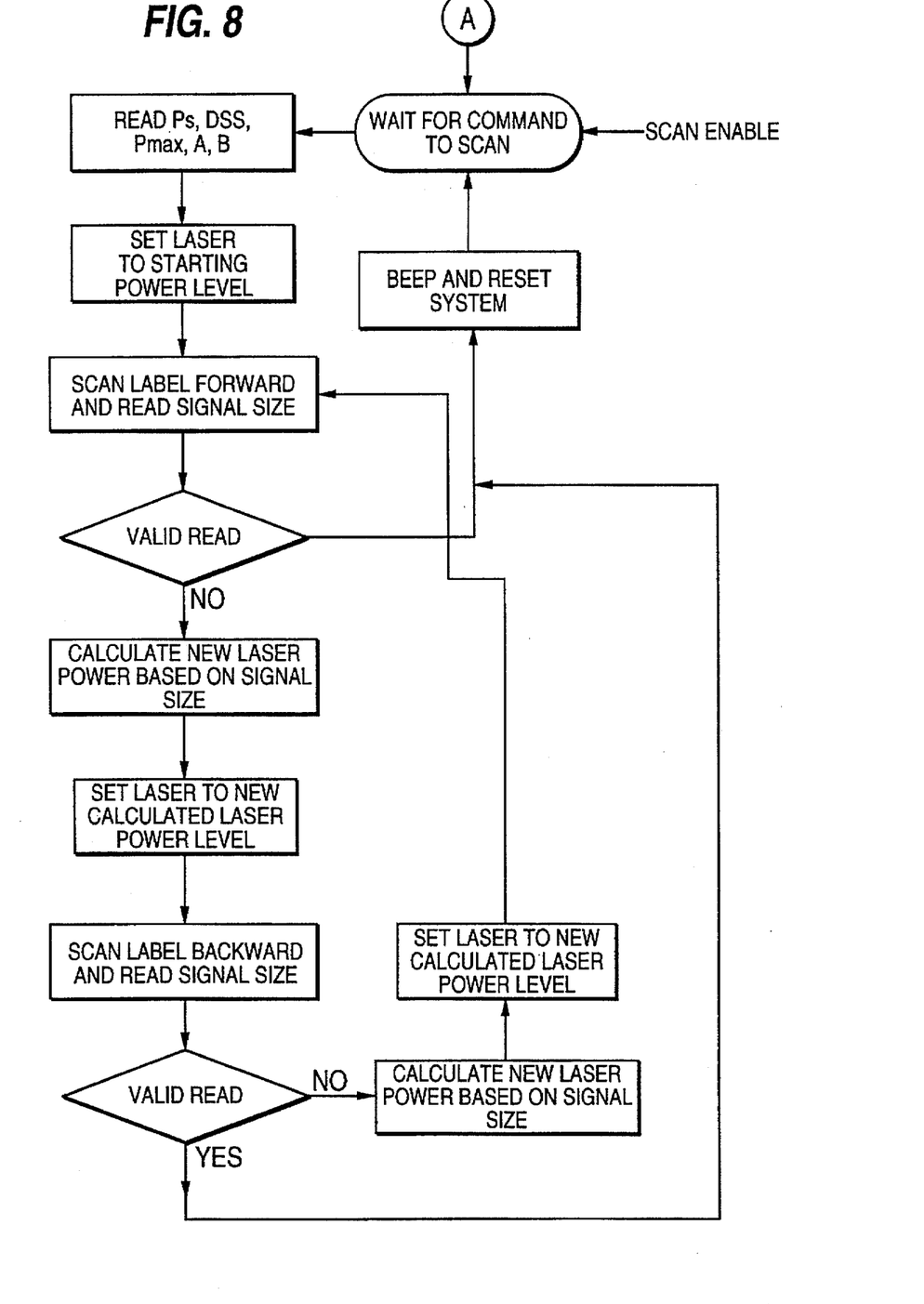
FIG. 8 is a flow chart of the scanning program embodied in the processor of FIG. 1 to provide a system in accordance with the third embodiment of the invention.
Figures 9, 10:
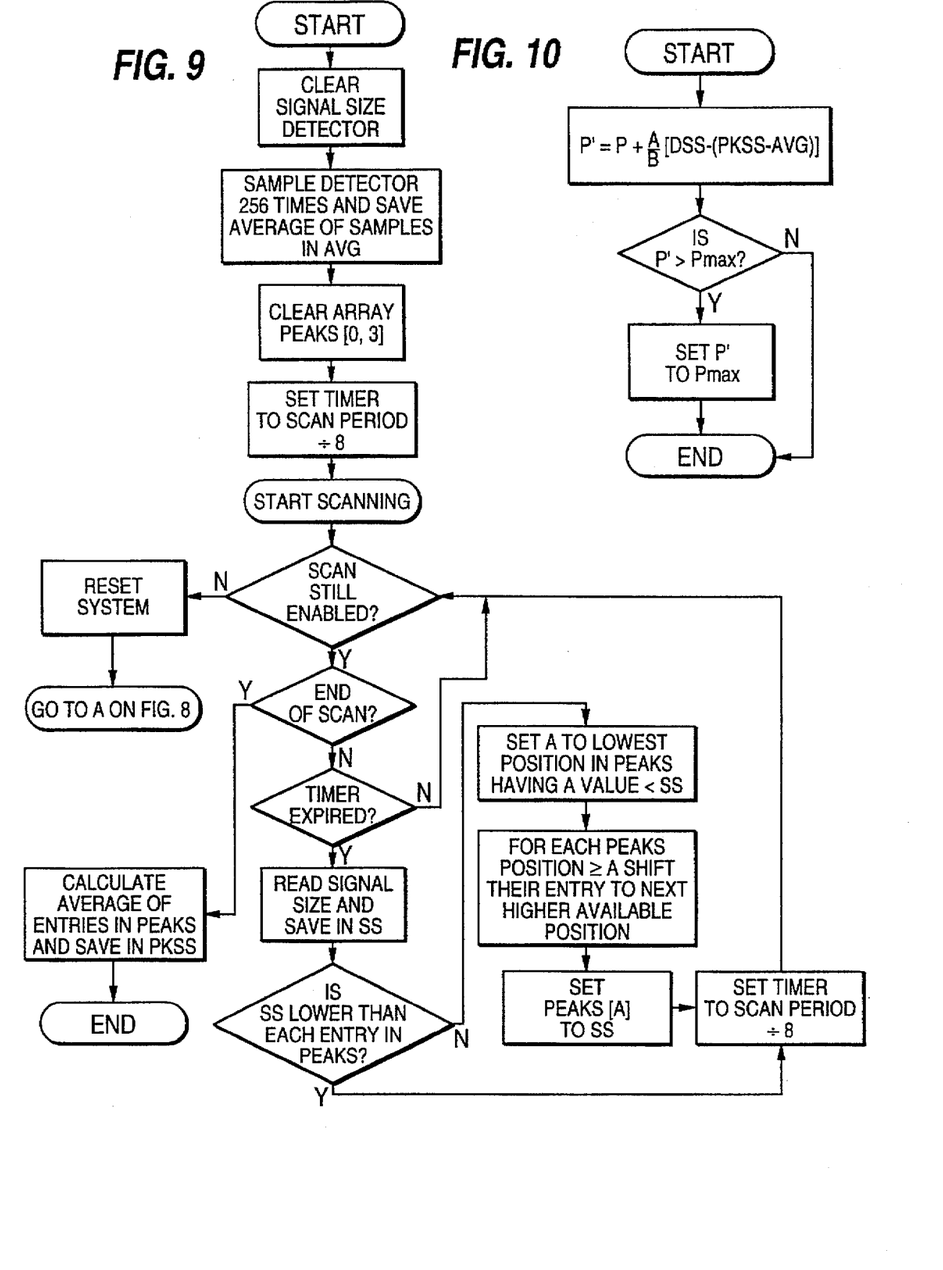
FIG. 9 is a flow chart illustrating processes in the scanning program in FIG. 8 entitled scan label forward and read signal size, and scan label backward and read signal size.
FIG. 10 is a flow chart illustrating processes in the scanning program in FIG. 8 entitled calculate new power based on signal size.

FIGS. 8 to 10 show the programming of the processor for the system in accordance with the third embodiment of the invention. This embodiment, like the second embodiment, calculates a new laser power for each scan, except for the first scan of a bar code. There is a different calculation of laser power for each scan, and a new laser power is calculated after each forward and backward scan.

Referring to FIG. 8, processor 10 is programmed to wait for a command to scan from scan enable 8. Upon receiving this command, the processor reads from memory 9 data storing the starting power level, Ps, the desired signal size, DSS, the maximum power, Pmax, and feed-back loop constants A and B. The starting power level represents the power level of the laser on the first scan. This value is empirically determined to provide half of the maximum desired output of the laser power. Pmax is the highest power level of the laser that the system will allow in order to avoid the risk of exposing users to levels of laser radiation in excess of those specified by the CRDH.

Next, the processor operates the laser diode circuit 23 to set the laser to Ps. The label is scanned forward, and signal size readings are taken during the scan. The scanning and reading operations of signal size will be described in greater detail in reference to FIG. 9. Briefly, the scanning and reading operation provides a peak signal size from signal size detector 16, PKSS, and an average of multiple measurements of the detector in the absence of a Vin signal, AVG, for later calculation of laser power. If a valid read of the bar code occurs during scanning, the sound generating circuit beeps and/or other valid read indicator. Then, scan enable 8 signals the processor to cease scanning, and the system resets and waits for the next command to scan. However, if no valid scan occurs, the processor calculates a new laser power based on the previously determined PKSS and AVG, and constants A and B. This calculation is described in greater detail with reference to FIG. 10.

Next the processor operates the laser diode circuit to set the laser to the calculated new power for the next scan. The system then scans backward, and repeats the above scanning and reading of signal size. If no valid read occurs during this scan, the processor calculates a new power level for the next forward scan. The scanning continues as described above until a valid read occurs, or scan enable 8 signals the processor to cease scanning (see A—A connectors in FIGS. 8 and 9).

The programming of the processor for scanning and reading signal size is shown in greater detail in FIG. 9. After the routine starts, signal size detector 16 is cleared in the manner described in reference to FIG. 5. After the detector reaches a steady state voltage on output line SIGSIZE (this can take approximately 500 μsec in a practical system), the detector is sampled by the processor 256 times. These samples are stored in the processor's built-in memory. The processor then calculates the average of these samples and stores the average as signal AVG. AVG represents the average size of the signal in the absence of a Vin signal, and will be used in calculating laser power to account for changes in the bias voltage of diode D2 (FIG. 5) that can occur due to temperature variation.

The processor 10 then clears an array, PEAKS[0,3], in its memory. This array has 4 positions referenced from 0 to 3. As will be shown, the purpose of this array is to store the four highest values of eight signal size measurements taken during each scan. Next, a timer is set by the processor to the scan period divided by eight. This timer is used to determine when each of the signal size measurements will be taken. The scan period is the duration for one full scan by the system across a bar code, and the integer '8' equals the number of signal size readings to be taken within that scan period. These readings will occur at equal intervals during the scan. In the alternative, to obtain a different number of measurements during a scan period, the integer '8' may be changed, however, it is preferably eight. The timer is implemented in the program stored in the processor as a check of a continuously running system 16 bit counter to see if it equals a value representing the counter output when the timer was set plus a count equalling the elapsed time of the scan period divided by eight.

Scanning then starts across a label containing the bar code. A series of three checks are performed by the processor. The first check is whether the scan is still enabled. The processor performs this check by testing the POWER/RESET signal from scan enable 8 for a disable signal (as previously described in reference to FIG. 1). If the scan is not enabled, the system resets and the processor waits for a command to scan in FIG. 8. If the scan is still enabled, a second check occurs to determine whether the end of the scan has been reached. In other words, has the processor driven, via scan control 7, the motor of the scanner to either of the opposite ends of its angular transverse of light beam. If the end of scan is detected, the processor calculates the average value of the entries in "PEAKS" and stores the result in an array PKSS to represent the peak signal size during the scan. However, if the end of scan has not been reached, the processor performs the third check to determine whether the timer previously set has expired. When the timer has expired, the signal size from detector 16 is measured and saved as signal size SS; otherwise, the processor returns to the first check.

Upon reading and storing signal size SS, the processor checks if the signal size value is lower than each entry in PEAKS. This is performed by comparing each entry in PEAKS to signal size SS. If the signal size value is lower than each entry, then the timer is reset to the scan period divided by eight, and the processor returns to the first check described above. This will occur when signal size SS cannot be one of the four highest entries of PEAKS.

But, if SS in not lower than any one of the entries, then signal size SS must be stored in PEAKS and the lowest valued entry in PEAKS removed. The entries 0 to 3 in PEAKS are organized from highest to lowest value such that entry 0 represents the highest value, and entry 3 represents the lowest value. The index variable A is set to the lowest position in PEAKS having a value less than signal size SS. For each PEAKS position equal to or greater than A, the entries are shifted to the next higher available position. Position PEAK[A] is set to SS by storing signal size SS in position PEAK[A].

For example, if A is 1 (which occurs when position PEAK[0]is greater than signal size SS, and positions PEAKS[1]-PEAK [3] are all lower than SS), then position PEAK[2]is stored in position PEAKS[3], position PEAKS [1]is stored in position PEAKS [2], and signal size SS is stored at position PEAKS [1]. Those skilled in the art can appreciate that there are a variety of ways to add signal size SS to PEAKS and to remove the lowest entry. FIG. 9 only shows the preferred processes to obtain this operation. The ordering of the values in PEAKS from highest to lowest is used as a matter of convenience in programming. In this alternative, the order need not be maintained so long as the highest four values of all the samples are saved for later averaging into array PKSS. Other alternatives to arriving at the value in array PKSS may also be used, for example, the highest or lowest entries in array PKSS may be ignored before averaging.

Until the scan is disabled or the end of scan is reached at first and second checks, respectively, signal size values will continue to be taken each time the timer has expired. Once the end of scan has occurred at the second check, the processor calculates the average of all entries in PEAKS, and saves the value in array PKSS.

As previously stated, the invention is not limited to eight measurements of signal size during a scan, more or less measurements may be taken with adjustment of the integer '8' when setting the timer. Further, the number of entries in PEAKS may be increased or decreased in accordance with the desired accuracy of array PKSS and the limitation of system architecture, so long as PKSS sufficiently represents the peak size of Vin for the laser power calculation.

One advantage to having multiple measurements of signal size, and using only a subset of those measurements to determine the value in array PKSS, is that during a scan the location of the label may only be partially covered by the angular transverse of the scanning beam. Consequently, only during part of a scan covering the bar code will the photo-detector receive light reflected from the bar code, and a corresponding Vin signal representing the bar code be produced. Thus, signal size measurements at multiple intervals during the scan provides a greater likelihood of arriving at a signal size of the Vin signal representing the bar code. Consequently, storing of a subset of the highest measured signal size values then produces a more accurate representation of the peak signal size of the Vin signal.

The calculation of the new laser power is described in FIG. 10. The processor performs the calculation by implementing the following formula:

$$P'=P+(A/B)[DSS-(PKSS-AVG)]$$

where:

P'=new calculated power level
P=the previous power level

The constants A and B are set to provide a convergence of P to P' required for operating a feed-back control loop. For example, A and B may equal 1 and 2, respectively.

From this equation it can be seen that the new calculated power level P' is produced by the addition of two terms, the previous power level on the prior scan, and an error term representing how far the value in array PKSS (minus an AVG offset) is from DSS, the desired signal size to the digitizer, multiplied by constants A and B.

After the power calculation is complete, the processor checks whether P' is greater than the maximum power level for the laser, Pmax. If P' is greater than Pmax, P' is set back to Pmax, the previous laser power level. This check is to provide that the laser power does not exceed Pmax.

Table I below provides, by way of example, the components and component values for a presently preferred embodiment of the circuits illustrated in FIG. 2, 3, and 5.

TABLE I

| U1A | Operational Amplifier Texas Instruments TLC272 |
| U1B | Operational Amplifier Texas Instruments TLC274 |
| Q1 | PNP Transistor 2N 3906 |
| Q2 | NPN Transistor 2N 3904 |
| Q3 | NPN Transistor 2N 4401 |
| X1 | Laser Diode | Toshiba TOLD 99221M |
| C1 | Capacitor | 0.1 µf (microfarads) ± 20% |
| C2 | Capacitor | 220 pf (picofarads) |
| C3 | Capacitor | 0.022 µf |
| C4 | Capacitor | 100 pf |
| C5 | Capacitor | 1000 pf |
| D1 | PN Diode | BAV99 |
| D2 | PN Diode | BAV99 |
| R1 | Resistor | 1.5 k (kilo-ohms) |
| R2 | Resistor | 20 ohms |
| R3 | Resistor | 6.8 k |
| R4 | Resistor | 15.0 k |

TABLE I-continued

| R5 | Resistor | 47 k |
| R6 | Resistor | 47 k |
| R7 | Resistor | 12 k |
| R8 | Resistor | 47 k |
| R9 | Resistor | 6.8 k |
| R10 | Resistor | 47 k |
| R11 | Resistor | 1 M (meg-ohms) |
| R12 | Resistor | 10 k |

From the foregoing description, it will be apparent that there has been provided an improved system for bar code reading and scanning with automatic bar code signal size control. Variations and modifications in the herein described system in accordance with the invention, will undoubtedly suggest themselves to those skilled in the art. Accordingly, the foregoing description should be taken as illustrative and not in a limiting sense.

We claim:

1. In an optical symbol reading system which provides signals representing an optical symbol in response to light returned from a symbol during scans of said symbol by a beam, said returned light being received by a photo-detector, where said returned light varies in intensity, a system for generating said beam and controlling the intensity thereof for controlling the intensity of said returned light, said beam generating and controlling system comprising:

(a) a light source which produces said beam with a variable optical power output level, (b) means for sweeping said beam across said symbol recursively, (c) means for producing a signal representative of said returned light received by said photo-detector, (d) means for detecting the size of said signal during said scans of said symbol, said detected signal size varying in response to said variations in the intensity of said returned light, (e) means for calculating, in response to said detected signal size, at least two optical power output levels of said light source, each being calculated after each of at least two consecutive scans of said symbol, and (f) means for setting the optical power output level of said light source by alternating said light source optical power output level among said at least two optical power output levels.

2. The beam generating and control system according to claim 1 further comprising:

means for storing data representing said at least two optical output power levels, said setting means including means responsive to data in said storing means for setting said light source to each of said at least two optical power levels.

3. The beam generating and control system according to claim 1 further comprising means for controlling said setting means and said detecting means in accordance with a stored program.

4. The beam generating and control system according to claim 3 wherein said controlling means includes a programmed digital microprocessor.

5. The beam generating and control system according to claim 3 further comprising means for enabling and disabling said beam, and said controlling means further includes controlling said enabling and disabling means.

6. The beam generating and control system according to claim 1 wherein said selecting means includes means for recognizing an end of each said recursive scans of said symbol, where said end of scan occurs when said beam scans across said symbol in a direction and opposite said direction, and after said recognizing means recognizes said end of scan, operating said setting means to set the optical power output level of said light source to one of said at least two optical power output levels.

7. The beam generating and control system according to claim 1 wherein said light source comprises a laser diode, and a photo-diode optically coupled to said laser diode monitors the optical power output level of said laser diode.

8. The beam generating and control system according to claim 1 where said means for producing said signal representative of said returned light includes a differentiating circuit coupled to said photo detector for enhancing transitions of said returned light received by said photo detector.

9. The beam generating and control system according to claim 1 where said detecting means includes means for measuring a plurality of detected signal sizes during each scan of said symbol, and said means for calculating calculates said at least two optical power output levels in response to at least one of said detected signal sizes.

10. The beam generating and control system according to claim 1 where said setting means includes means responsive to said detected signal size and first and second control thresholds, corresponding respectively to said signal size being below and above a certain size, wherein said second control threshold is significantly greater than said first control threshold, said setting means having means responsive to said detected signal size to set said optical power output level to the lower power level of said at least two optical power output levels if said detected signal size is greater than said second control threshold, and to set said optical power output level to the higher power level of said at least two optical power output levels if said detected signal size is less than said first control threshold.

11. The beam generating and control system according to claim 10 where said second control threshold represents a maximum level of said signal size above which said system saturates and can not effectively provide said signals representing said symbol.

12. An optical symbol reading system comprising:
a light source which produces a beam at one of a plurality of optical power output levels;
a scanner which recursively scans said beam across said symbol in each of first and second directions;
a photo diode which detects light reflected from said optical symbol during said recursive scans;
a differentiating circuit which produces a signal representative of said reflected light;
a signal size detector which determines a power level of said signal; and
a processor which calculates, in response to said signal power level, a first optical power output level when said beam is scanned in said first direction and a second optical power output level when said beam is scanned in said second direction, and sets said optical power output level of said beam to one of said first and second calculated optical power output levels.

13. The optical symbol reading system of claim 12, wherein said processor alternates setting said optical power output level of said beam between said first and second optical power output levels.

14. The optical symbol reading system of claim 12, wherein said processor sets said optical power output level to said second optical power output level for said scans in said first direction and to said first optical power output level for said scans in said second direction.

15. The beam generating and control system according to claim 12, wherein said light source is a laser diode which is optically coupled to said photo diode.

16. The optical symbol reading system of claim 12, further comprising:
a memory which stores data representing each of said first and second optical power output levels;
wherein said processor sets said light source to one of said first and second optical power output levels based on said data in said memory.

17. The optical symbol reading system of claim 12, further comprising an enable circuit for enabling and disabling said beam.

* * * * *